A. SATTLER.
DIRIGIBLE HEADLIGHT.
APPLICATION FILED OCT. 27, 1913.
1,095,289.
Patented May 5, 1914.
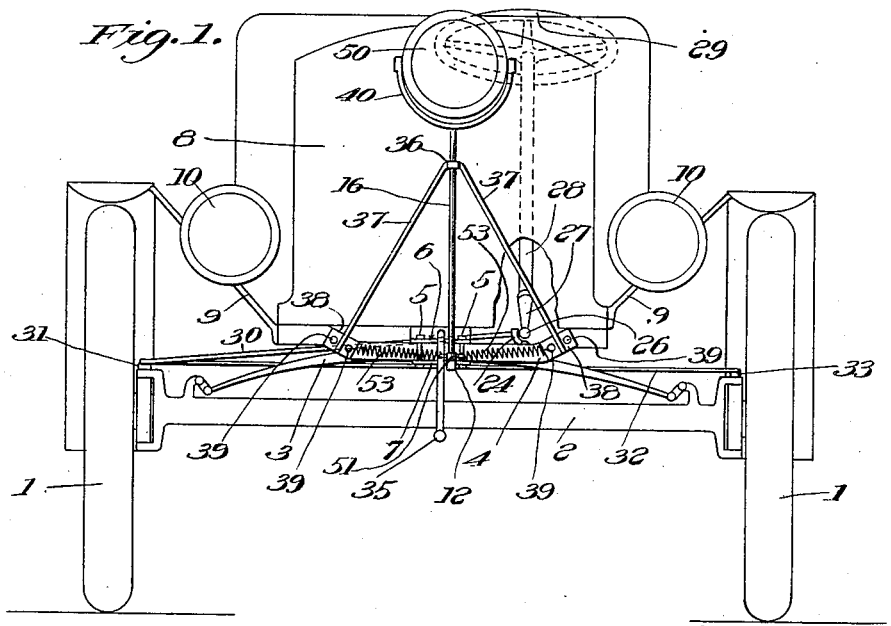
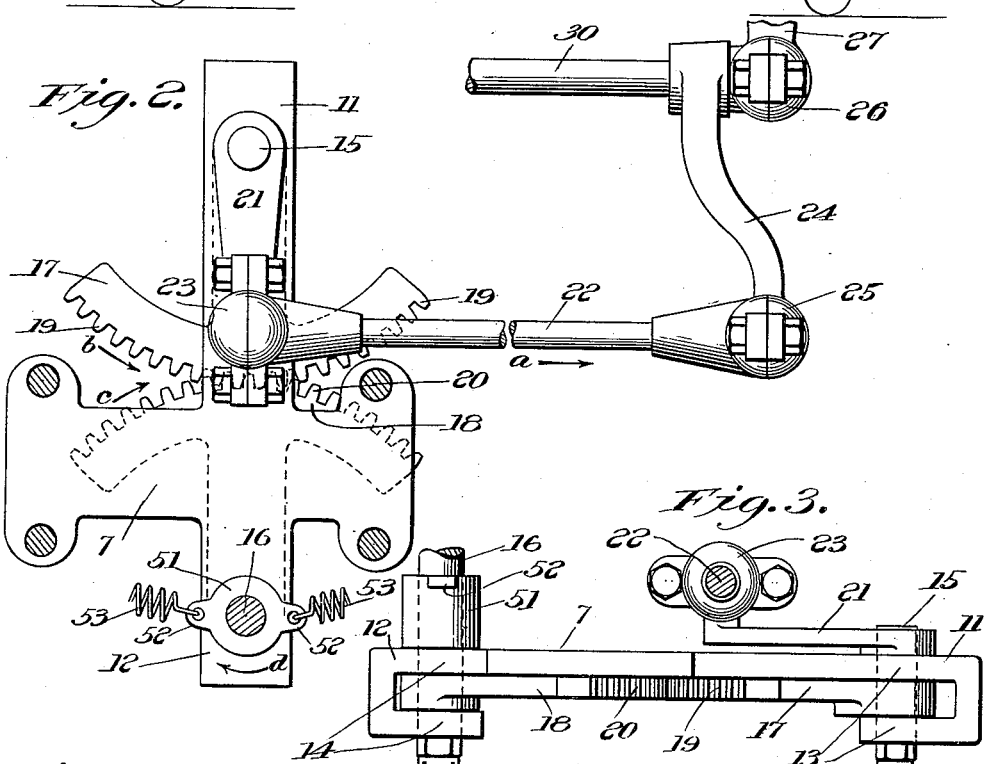
Witnesses:
Alan Franklin
Sully Russo
Inventor
Andrew Sattler

UNITED STATES PATENT OFFICE.

ANDREW SATTLER, OF CARPENTERIA, CALIFORNIA.

DIRIGIBLE HEADLIGHT.

1,095,289.  Specification of Letters Patent.  Patented May 5, 1914.

Application filed October 27, 1913.  Serial No. 797,484.

*To all whom it may concern:*

Be it known that I, ANDREW SATTLER, a citizen of the United States, residing at Carpenteria, in the county of Santa Barbara and State of California, have invented a new and useful Dirigible Headlight, of which the following is a specification.

This invention relates to a dirigible headlight for automobiles.

Considerable danger is experienced in driving an automobile at night with the ordinary stationary side headlights, for the reason that the driver is unable to see ahead of him when turning the automobile. To avoid this danger the side lights have been arranged to turn with the front wheels of the automobile, but while this arrangement of the lights enables the driver to see in the direction in which the automobile turns, it is dangerous for other vehicles inasmuch as the side of the automobile from which the lights may turn away is left in complete darkness, making it impossible for others to determine with accuracy the exact location of the automobile. Consequently drivers of other vehicles are often misled by an automobile with its side headlights turned to one side and collide with it.

The object of my invention is to provide a dirigible automobile headlight, adapted to be used in conjunction with the ordinary, stationary, side automobile headlights, which will turn when the automobile turns in the direction in which the automobile turns, so that the driver of the automobile, by means of my improved headlight, may see directly ahead of him when the automobile turns, and by means of the stationary headlights the exact location of the automobile may be determined by drivers of other vehicles on the same road, thus reducing to a minimum the danger of collision when driving the automobile at night.

Referring to the drawing: Figure 1 is a front elevation of an automobile embodying my invention. Fig. 2 is a plan view on an enlarged scale, of my invention, with certain parts removed. Fig. 3 is a side elevation of my invention, on an enlarged scale, with certain parts removed.

The automobile structure herein shown is well known and my invention is particularly adapted to it, but my invention may be applied to other automobiles, if desired, and I therefore do not limit the application of my invention to any particular make of automobile.

In said structure 1 designates the front wheels of the automobile which are mounted in the usual manner upon the axle 2. Upon said axle is mounted the semi-elliptic spring 3. A supporting member 4 is secured to said spring in the center thereof by means of bolts 5 and plates 6 and 7, resting respectively upon the top and bottom of the spring and through which said bolts extend. Supported upon the member 4 is the engine casing 8 of the automobile. Upon brackets 9 are secured the usual stationary side headlights 10 of the automobile. The plate 7 is provided with extensions 11 and 12 on which are formed bearings 13 and 14 in which are journaled respectively a short shaft 15 and a rod 16. Segments 17 and 18 provided with teeth 19 and 20 which mesh so that the segments turn with each other, are mounted respectively upon said shaft 15 and the lower end of rod 16. A crank 21 is secured to the shaft 15 and is connected to one end of rod 22 by ball and socket joint 23, the other end of which rod is connected to one end of arm 24 by ball and socket joint 25. The other end of said arm is connected by ball and socket joint 26 to crank 27 at the lower end of the steering post 28. Upon the upper end of the post is secured the steering wheel 29.

One end of rod 30 is connected to crank 27 by a ball and socket joint 26 and the other end of the rod connects to the usual steering arm 31 of one front wheel of the automobile, by means of which said wheel is turned from right to left when the steering wheel 29 is correspondingly turned by the driver. A rod 32 connects the arm 31 to the steering arm 33 of the other front wheel, whereby said wheels are turned in unison with each other. The rod 16 extends vertically from its bearing 14 in front of the engine casing 8 at one side of the engine crank 35, but substantially in the center of the automobile. The crank 35 extends forwardly of the extension 12 and the rod 16 so as to escape said parts when turned to crank the engine. The upper end of the rod 16 is journaled in bearing 36 supported on the upper end of the brace rods 37, which rods are provided at their lower ends with webs 38 through which bolts 39 extend into the supporting member 4, whereby said bracing rods 37 are secured in position upon the automobile. The bearing 36 and brace rods 37 enable the upper end of rod 16 to turn smoothly and maintain the upper end of said rod properly in position. The upper end of the rod 16 is provided with a yoke 40 in which is secured a dirigible headlight 50, which lies substantially in the center and in front of the engine casing 8 at the top of said casing in such position that the light projects its rays directly in front of the driver. A collar 51 which surrounds the rod 16 is adapted to turn therewith and is provided with ears 52 to which are connected springs 53, the other ends of said springs being connected to bolts 39, the purpose of which is to take up the back lash between the teeth 19 and 20 of the segments 17 and 18.

The operation is as follows: Assuming that the automobile is turned to the right by the steering wheel 29 and its connections, the rod 22 through the medium of steering post 28, crank 27, arm 24, joints 25 and 26 is drawn in the direction of the arrow $a$ Fig. 2, which causes segment 17 through the medium of crank 21 to be turned in the direction of arrow $b$ and the segment 18 to be turned in the direction of arrow $c$; as the segment 18 turns, the shaft 16 and headlight 50 are turned to the right in the direction of the arrow $d$, and the headlight 50 projects its rays to the right so that the driver can see ahead of him in the direction in which the automobile turns. When the steering wheel 29 is turned in a reversed direction, i. e. to the left, the above described operation is reversed, and the wheels 1 and headlight 50 are correspondingly turned to the left. The stationary side headlights 10, which always project their lights forward parallel with the body of the automobile, enables the drivers of other vehicles to determine the exact location of the automobile, and thus avoid the liability of said other vehicles colliding with the automobile when it turns.

By combining the dirigible headlight with the side stationary headlights of the automobile, the danger of collision in driving an automobile at night is reduced to a minimum.

What I claim is:

In combination with the steering wheel, steering post and steering post crank of an automobile, of an arm connected at one end to the steering post crank, a rod connected at one end to the other end of said arm, a crank connected to the other end of said rod, a segment connected to and adapted to turn with said crank, another segment meshing with the aforesaid segment, a rod connected to and adapted to turn with said latter segment, and a light mounted upon and adapted to turn with said rod.

In testimony whereof, I have hereunto set my hand at Los Angeles, California, this 22nd day of October, 1913.

ANDREW SATTLER.

In presence of—
ALAN FRANKLIN,
LORRAINE E. DARROW.

---

Copies of this patent may be obtained for five cents each, by addressing the "Commissioner of Patents, Washington, D. C."